United States Patent [19]
Calderazzo

[11] 4,102,439
[45] Jul. 25, 1978

[54] TORQUE REACTION OPERATED BICYCLE BRAKING SYSTEM AND MOUNTING STRUCTURE

[75] Inventor: Franklin James Calderazzo, Norwalk, Conn.

[73] Assignee: Richard N. Jayson, Old Greenwich, Conn.; a part interest

[21] Appl. No.: 767,893

[22] Filed: Feb. 11, 1977

Related U.S. Application Data

[63] Continuation-in-part of Ser. No. 690,922, May 28, 1976.

[51] Int. Cl.² .............................................. B62L 3/00
[52] U.S. Cl. .................................... 188/24; 188/2 D; 188/140 R
[58] Field of Search .................... 188/2 D, 24, 25, 26, 188/27, 140, 344, 59; 74/517

[56] References Cited

U.S. PATENT DOCUMENTS

| | | | |
|---|---|---|---|
| 3,842,946 | 10/1974 | Blevens | 188/24 |
| 3,882,971 | 5/1975 | Peckham, Jr. | 188/24 |

FOREIGN PATENT DOCUMENTS

| | | | |
|---|---|---|---|
| 924,490 | 3/1947 | France | 188/24 |

Primary Examiner—George E. A. Halvosa
Attorney, Agent, or Firm—Hopgood, Calimafde, Kalil, Blaustein & Lieberman

[57] ABSTRACT

The invention contemplates a bicycle-braking system in which the rear-wheel brake is selectively operable, in which rear wheel braking torque is the means of actuating the front brake, and further in which substantial force-amplification characterizes the actuating connection between (a) rear-wheel torque-reaction pick-off and (b) front brake actuation. Rear-wheel braking torque is noted by physical displacement against a spring, so that if front-wheel brake torque becomes so effective as to substantially reduce rear-wheel brake torque, the spring will automatically react to reduce the magnitude of front-wheel brake effort.

26 Claims, 11 Drawing Figures

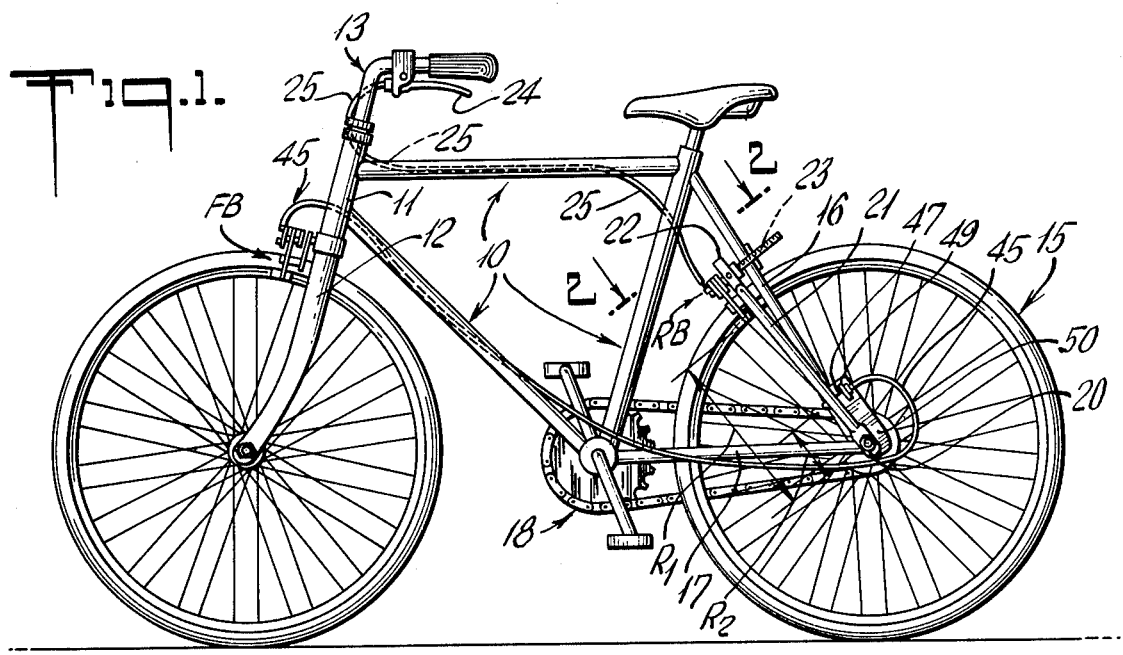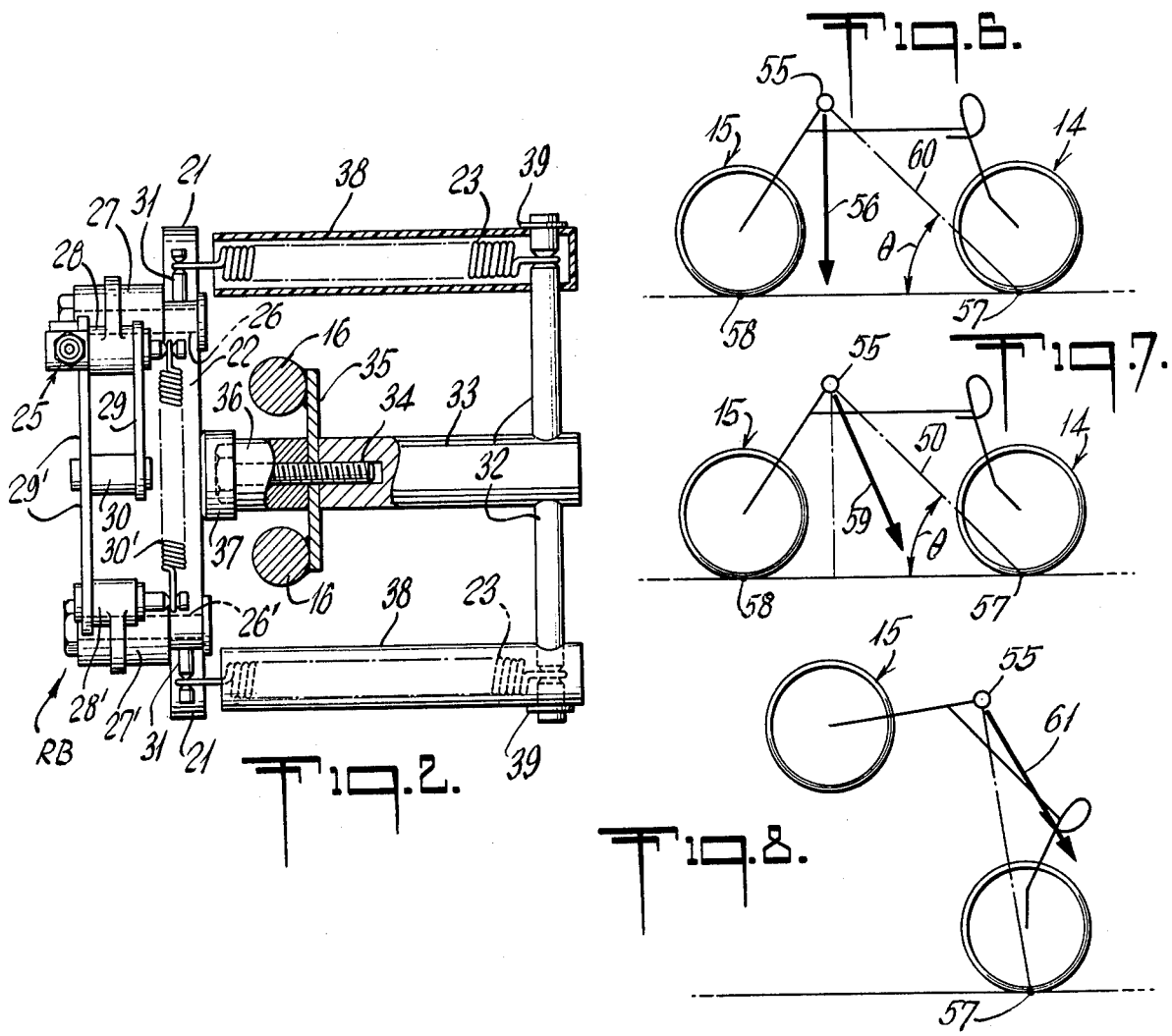

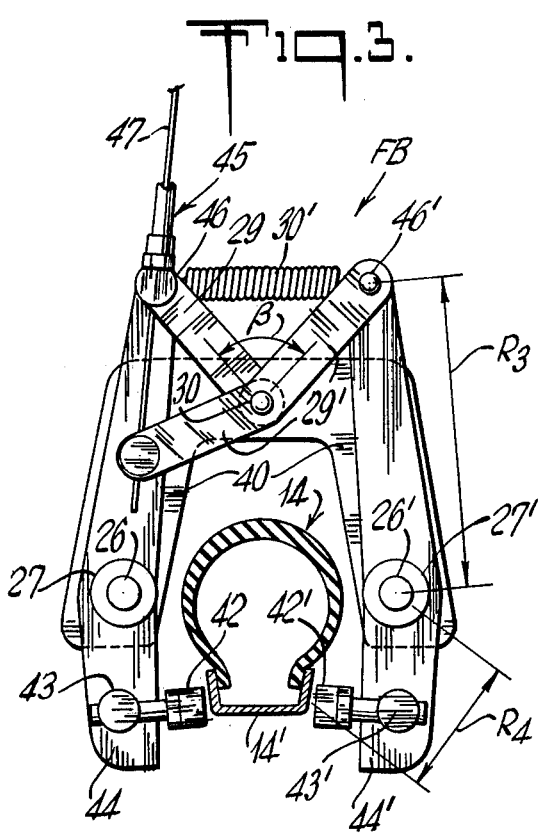
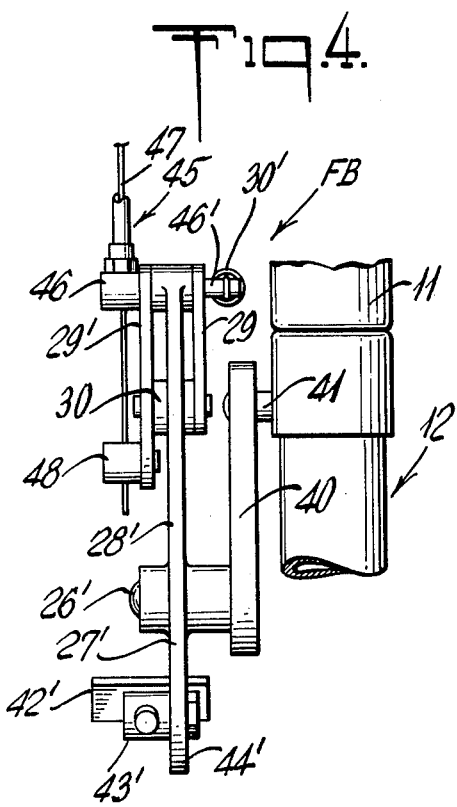
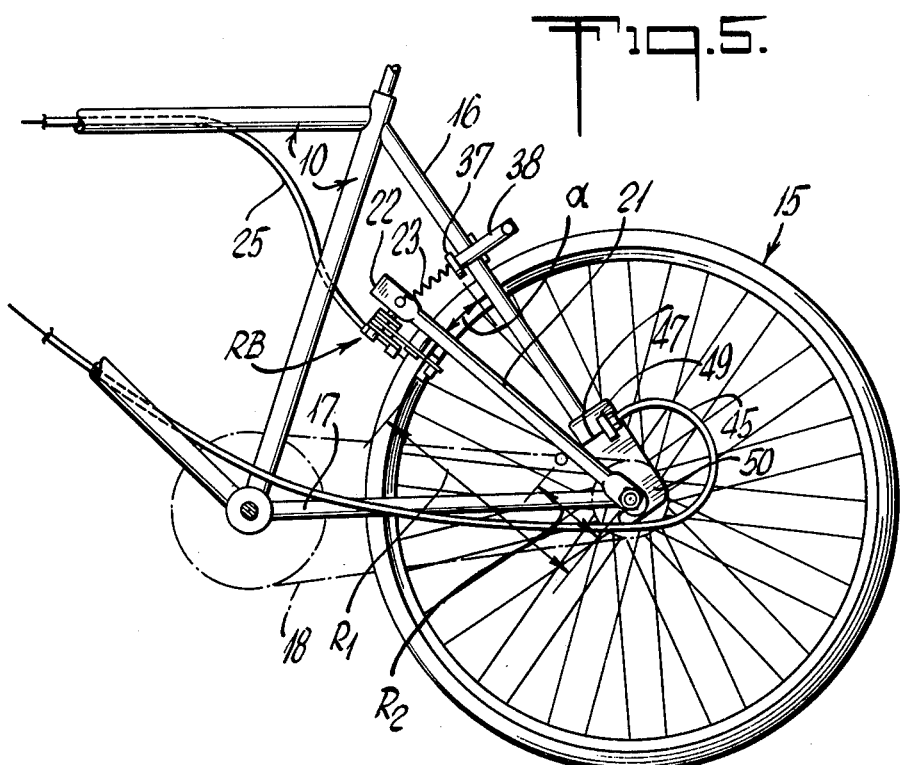

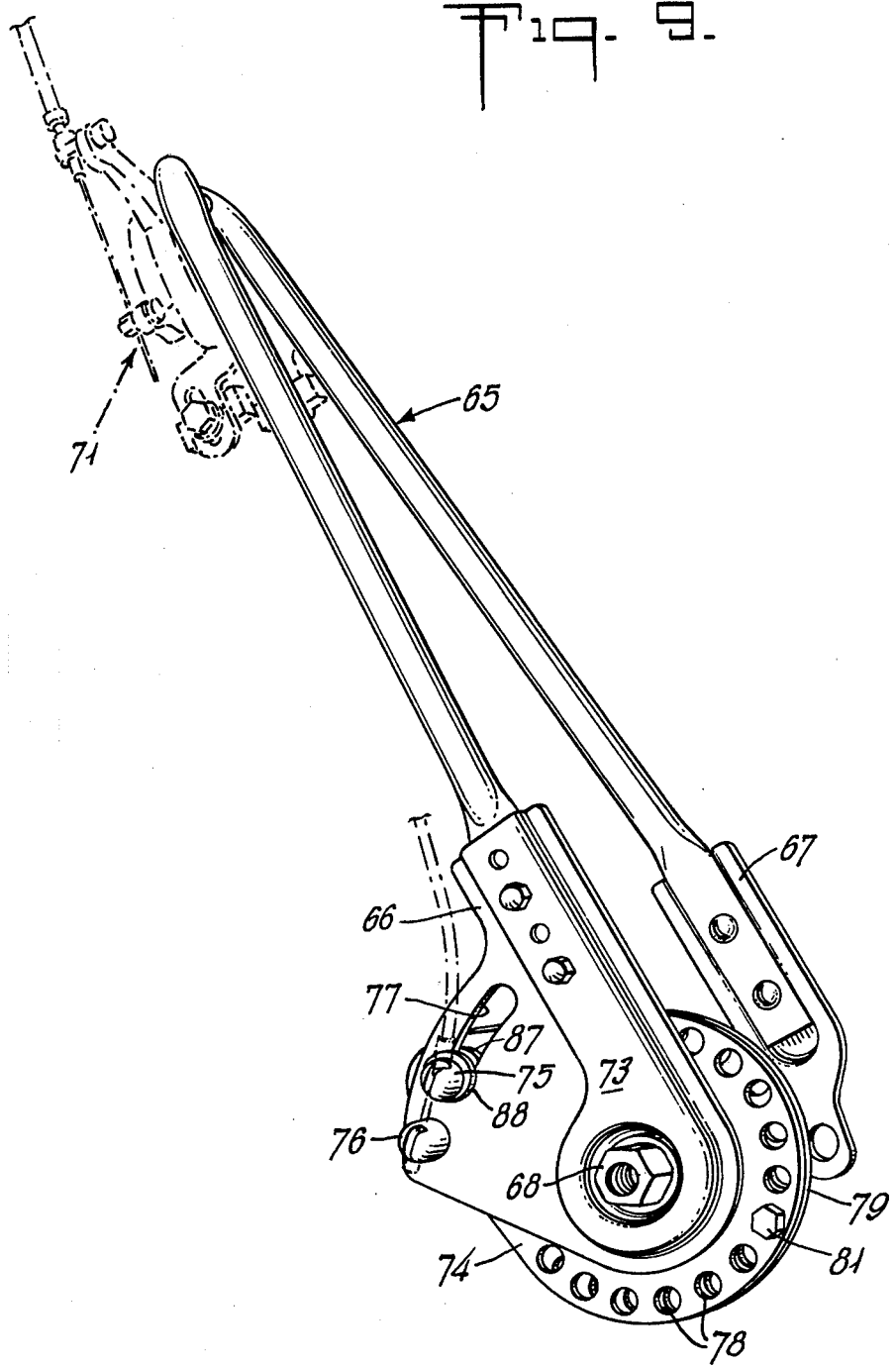

TORQUE REACTION OPERATED BICYCLE BRAKING SYSTEM AND MOUNTING STRUCTURE

This invention relates to an improved braking system primarily applicable to bicycles. And this application is a continuation-in-part of my copending application, Ser. No. 690,922, filed May 28, 1976.

With increased use of bicycles in the context of today's heavy and rapid automobile traffic, it is becoming more important that a bicycle shall be able to stop with all possible speed and safety. It is known that two-wheel braking has the maximum potential for rapid stops, but the lack of adequate control of front-wheel brake application renders such braking dangerous under "panic" stop conditions, particularly in the case of a lightweight racing-style machine wherein the rider's weight is dominant and is located relatively high and forward in relation to the span between axles. Part of the difficulty in safely applying two-wheel brakes has been the need to concentrate on how much braking effort to seek, via independent front and rear brake controls. And the Federal Consumer Product Safety Commission has recently republished its Safety Standard for Bicycles, imposing stringent goals, particularly as to the safe smooth operation of brakes capable of 0.5-g deceleration stops; I am aware of no prior system which is inherently capable of achieving such goals.

It is accordingly an object of the invention to provide an improved braking system of the character indicated, inherently avoiding the deficiencies of past systems and capable of achieving the goals of the new Federal standards.

It is a specific object to achieve the above-stated object with a single hand-operated control.

Another object is to provide an improved bicycle braking system which eliminates the possibility of "pitchover" in the course of stopping on normal pavement surfaces.

A further object is to provide such a braking system in such form as to be applicable to a wide variety of sizes and styles of bicycle, using the same components for each of various different styles.

Another specific object is to provide simple and easily installed kit or subassembly structure which can be applied as a modification of the braking system of a variety of existing bicycles.

A general object is to achieve the above objects with a braking system which has a relatively high degree of inherent safety and effectiveness, even in the presence of wet conditions, i.e., in the rain.

Other objects and various further features of novelty and invention will be pointed out or will occur to those skilled in the art from a reading of the following specification in conjunction with the accompanying drawings. In said drawings, which show, for illustrative purposes only, a preferred embodiment of the invention:

FIG. 1 is a view in side elevation of a bicycle equipped with a braking system of the invention;

FIG. 2 is an enlarged view of the rear brake and its mount as seen from the plane 2—2 of FIG. 1;

FIGS. 3 and 4 are respectively enlarged front and side views of the front brake in the system of FIG. 1;

FIG. 5 is a fragmentary view similar to FIG. 1; but showing the rear-wheel region in a condition of braked deceleration;

FIGS. 6, 7 and 8 are simplified diagrams to illustrate various operating conditions, for a comparison between unstable brake operation of the prior art and stable brake operation of the invention;

FIG. 9 is a view in perspective of subassembly structure for a modified form of the invention, such subassembly structure being adapted for mounting to the rear axle of a bicycle;

Figure 10:
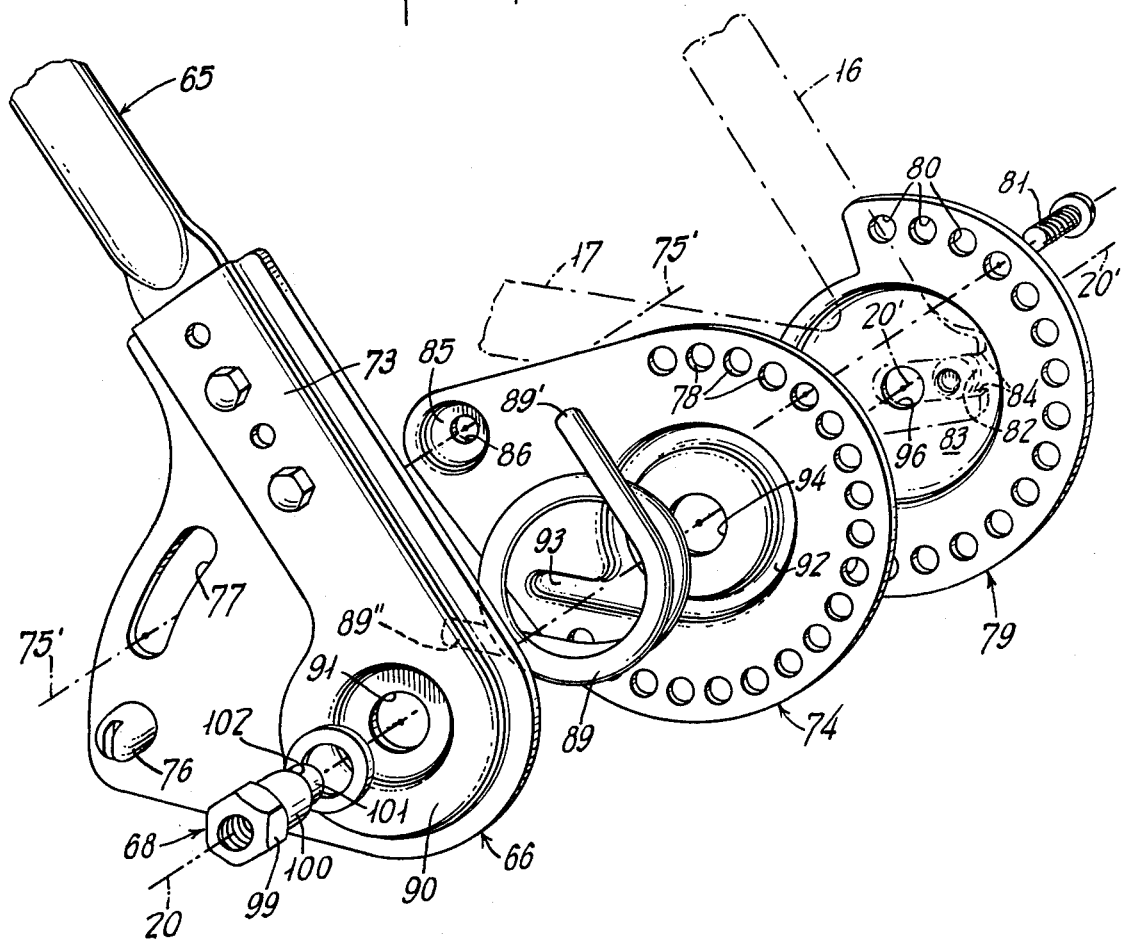
FIG. 10 is an exploded view of foreground elements of the subassembly of FIG. 9.

In FIG. 1, the invention is shown in application to a conventional bicycle having central rigid frame members 10 including a tubular bearing 11 for orientation of the steering column of a front fork 12 and handlebar 13. A front wheel 14 is rotatably mounted to and between the outer ends of fork 12, and front-wheel caliper-brake structure FB is shown mounted to the base of fork 12, for squeezing application to the rim of wheel 14. A rear wheel 15 is conventionally mounted between rigid bifurcated ends of further frame structure, comprising upper and lower legs 16–17, and driving torque is applied to rear wheel 15 via pedal-operated sprocket means 18. Unlike conventional bicycle systems, a rear-wheel brake RB, which may be of the conventional rear-wheel caliper variety, is movably mounted with respect to the frame, being guided for constant-radius displacement about the rear-wheel axle 20.

As shown, a unitary fork comprising spaced arms 21 has a connected end 22 which mounts the rear-wheel brake R, and the free other ends of arms 21 are pivotally mounted to the rear axle 22 and astride the rear wheel 15; spring means 23 coacts between fork end 22 and frame legs 16 to normally urge the adjacent relationship of FIG. 1. Handlebar-mounted actuating means 24 utilizes a Bowden cable 25 for selective squeezing application of the shoes of the rear-wheel brake RB to the rim of the rear wheel, and in any such operation the rear-wheel brake will drag the rear wheel and thus, for forward motion, will pivotally displace fork arms 21, against increasing action of spring means 23 and about the rear axle. Once the bicycle has stopped, or the actuating means 24 has been released, the spring means 23 (which is preferably preloaded against a stop, to be later described) returns fork arms 21 and brake RB to the position of FIG. 1.

More specifically as to the rear brake RB, and referring additionally to FIG. 2, the connected end 22 of the brake-radius arms 21 mounts spaced pivot stud or bolt means 26–26' for the respective pivot bosses 27–27' of caliper arms 28–28' of the brake. Friction shoes will be understood to be carried at the lower ends of arms 28–28' for selective squeezing application to the rim of wheel 15; and to develop such squeezing application a toggle mechanism comprising links 29–29', pivotally connected to each other at 30 and to the respective upper ends of arms 28–28', is actuated by cable 25 to spread apart the upper ends of arms 28–28' in the course of applying the rear-wheel brake; tension-spring means 30' connects the upper ends of arms 28–28' to normally urge the brake-off condition. Other forms of brake may be selected for rear-wheel braking, but I have chosen to employ the same style of caliper brake for front and rear use. Since the particular style selected is of more importance in connection with front-wheel application, more detail will become apparent from later description in connection with FIGS. 3 and 4.

FIG. 2 is also useful for its showing of the movable connection of the brake-mounting end 22 of arms 21. Two return springs 23 are shown, being connected at one end to pins 31 on mount 22, and being connected at their other ends to a frame-referencing member 32. Member 32 may be a rod carried at the rear end of a post 33 which is bolted at 34 to a plate 35 welded to and between the upper frame legs 16. A spacer 36 preferably positions the head of bolt 34 so that a resilient snubbing cap 37 on the bolt head can always stop the spring return of mount 22 in clearance relation to legs 16. As previously indicated, at the snubbed or returned position of the rear-wheel brake RB (FIG. 2), spring means 23 is preferably in preloaded condition, so that the preload must be overcome by rear-wheel brake torque before arms 21 and brake RB are displaced from the snubbing stop 37. Preload will generally be a function of the rider's size and weight, bicycle style, and rider preference; and preload selection is available through choice of spring length and spring rate, and/or by selecting the spacer length at 36, as will be understood. Description of the rear-brake suspension is completed by noting protective sheaths 38 carried by member 32 and substantially encasing the respective springs 23 in their most retracted position; sheaths 38 may be of injection-molded plastic and are shown retained by snap rings 39 to member 32.

Additional reference is made to FIGS. 3 and 4 in connection with the front brake FB, and the same reference numbers are repeated, where applicable, since it has been indicated that the particular described rear-wheel caliper brake may be the same as the front-wheel caliper brake. In particular, the pivot bosses 27-27' of the caliper arms 28-28' of front brake FB are mounted by studs 26-26' to a U-shaped base plate 40, the spaced arms of which straddle the front-wheel tire; and plate 40 is anchored at 41 to the front-wheel fork structure 12. The tire-mounting rim 14' of the front wheel is shown with side flanges against which friction shoes or blocks 42 are poised for squeezing contact in a front-wheel braking condition. The friction blocks 42 are carried by mounting structure 43-43' at the lower ends 44-44' of the caliper arms 28-28'. Front-brake actuation is via another Bowden cable 45, having an end of its sheath referenced at 46 to the point at which toggle link 29 is pivotally connected to arm 29, and having the corresponding end of its tension wire 47 connected at 48 to the extended end of the other toggle link 29'; the pivotal connection of toggle link 29' to the upper end of caliper arm 28' is shown at 46'.

In accordance with a feature of the invention, the front-wheel brake structure and its actuating mechanism incorporate excessive capacity for front-wheel braking-torque development, but this capacity is never used unless rear-wheel braking-torque development exceeds a predetermined threshold, such threshold being in large part determined by the preloaded character of the springs 23 for returning the rear-wheel brake mount 22 to its snubbed or home position, at stop 37. And front-wheel brake application is only to the extent that rear-wheel braking torque has been operative to displace the brake-mounting means 21-22, through a displacement angle α, as to the substantially full-on position depicted in FIG. 5. To this end, angular displacement of one of the arms 21 is picked off by the other end of the central wire 47 of Bowden cable 45, the corresponding end of the Bowden-cable sheath being frame-referenced at a suitable fitting 49, secured by means 50 to the adjacent frame leg 16. One or both of the fittings 46-49 will be understood to incorporate lock-nutted or equivalent means of adjustment of the effective length of the compressional sheath of the Bowden cable 45, whereby shoes 42 are normally in relatively closely spaced but free-running adjacency to the flanges of rim 14', for the retracted position of the rear-wheel brake mount 21-22.

In order to achieve excessive capacity as to front-wheel braking effort, I shall explain the several force-multiplying features which have been incorporated into the described structure, it being recalled that a displacement which reflects instantaneous rear-wheel braking torque (beyond preload threshold) is to be used at substantial force amplification or mechanical advantage, in application of front-wheel braking effort. A first stage of this amplification occurs by reason of an approximately 3:1 relation between wheel-rim radius $R_1$ and Bowden-wire pick-off radius $R_2$, both taken about the rear-wheel axis. A second stage of this amplification occurs within the front-brake structure by reason of an approximately 2:1 relation between crank radius $R_3$ and effective shoe-effort radius $R_4$ about the respective pivots 26-26' for caliper arms 28-28'. And a third stage of the amplification occurs by reason of the toggle geometry as it changes from approximately 1:1 to 1:2 or more in the course of applying the front brake, as will be discussed. Thus, in applying the front brake, force amplification is at least the product of these ratios, being greatly in excess of two-fold and in fact up to 12:1 or more.

More specifically, as to the toggle geometry, the links 29-29' are seen in the brake-off condition (FIG. 3) to be at an angle $\beta$ of approximately 90° to each other, meaning that an initial increment of Bowden-cable squeeze and displacement (between points 46-48) accounts for development of an initial increment of spreading force and displacement (between points 46-46') of substantially the same magnitude. Once the shoe-to-rim clearance is closed, the geometry has changed such that the angle $\beta$ is greater, meaning that increments of spreading displacement at 46-46' are accompanied by substantially and increasingly greater increments of spreading-force development. For example, when the Bowden cable 45 has applied the shoes 42-42' to the front-wheel rim to the extent of an angle $\beta$ of about 115°, the force amplification via the toggle links (i.e., Bowden-cable squeeze forces, as compared with caliper-spreading force between points 46-46') is approximately 1.5:1. When the angle $\beta$ is 127°, the force-amplification ratio is about 2:1; and at $\beta = 140°$, the force-amplification ratio is approximately 2.7:1.

It will be seen that, with a single hand-controlled rear-brake application at 24, and as long as the rear-wheel braking torque exceeds the predetermined level and rate established by means 23-36-37, the front-wheel brake will be applied. This will be at greatly amplified front-wheel brake-actuation force, and the limit of stable braking will be to the extent that the instantaneous center of gravity of the operator and his machine is subjected to a resultant vector (gravity and deceleration) which does not go forward of the point of front-tire contact with the road. By the time this vector approaches such a forward position, the road-contacting force of the rear wheel will have materially decreased, so that rear-wheel braking torque will have correspondingly decreased, meaning that springs 23 will have eased the action of Bowden cable 45, thus relieving the force of front-wheel brake application, and therefore allowing the resultant vector to return to a safe orientation, rearward of the point of front-tire contact with the road.

The foregoing discussion will perhaps be better and more fully appreciated by reference to the simplified diagrams of FIGS. 6, 7 and 8. In FIG. 6, the operator and his machine are proceeding normally, their combined center of gravity being designated at region 55 and with a heavy arrow 56 designating the only applicable resultant acceleration vector, attributable solely to gravity. The vector 56 is seen to lie safely intermediate the points 57-58 of front and rear-wheel contact with the road.

For the stable braking achieved by my invention, FIG. 7 shows that the vector 59 is the resultant of deceleration and gravity, being orthogonally related components when the road is level. Vector 59 is seen to be forwardly canted but to be within the limit 60 determined by the front-tire contact with the road. Thus, for example, as long as the geometry of the rider and the machine is such that the limit 60 is at an angle $\theta$ which is about 55° or less with respect to the horizontal, my invention will enable stable braking at as much as 0.70-g deceleration. It will be understood, however, that the real limit of deceleration is imposed by the coefficient of friction between the tires and the road and that, for example, most road surfaces will not permit decelerations as great as 1-g.

FIG. 8 depicts the unstable braking condition which is typical of present practice, wherein the rider must rely on his own separate actuations for front and rear wheel brake operation. If he carelessly panics and calls for strong front-wheel braking such that the resultant vector 61 is directed forward of the front-tire contact, he will have already begun to pitch himself and his machine over the front wheel, before he can react to relieve the front-wheel braking effort. On the other hand, with the invention, as discussed in connection with FIG. 7, the front-wheel braking effort is relieved as soon as and in direct response to any decrease in rear-wheel braking torque.

It will be seen that I have described improved braking mechanism meeting all stated objectives. Since the system is inherently stable whatever the size or weight of the operator, or his machine, and since such stability is inherent even for the case of excessive front-wheel braking capacity, one can at all times achieve maximum safety and stability, should maximum braking effort be called for. The rider-machine geometry in terms of the gravity vector is the sole determinant of limiting stable braking effort.

As a practical matter, and in view of the very substantial mechanical advantage with which my front-wheel braking effort is developed, I employ friction material other than rubber, at shoes 42-42', a preference being indicated for the material known as Type R-451, being an automotive-type friction material produced by RM Friction Materials Company, a division of Raybestos - Manhattan, Trumbull, Conn. This automotive material has a lesser coefficient of friction than the conventional rubber-based brake blocks of most bicycle caliper brakes, but the Raybestos material is longer-wearing and exhibits less change in friction coefficient as a function of weather (wet vs. dry) and as a function of sustained use (e.g., less susceptible to fading, as in long downhill runs).

Because my braking system is always available at excessive capacity for front-wheel application, the safe and stable stops which I have described for the single-rider situation will be seen also to apply for the double-load case of carrying an extra rider, as for example a passenger seated on the horizontal frame bar between saddle and handlebars, or the rear passenger of a tandem machine. In all cases, it is the geometry of net center of gravity and its location (in relation to the gravity vector) which determine the safe upper limit of braking effort. In fact, since the described brake structure of FIGS. 3 and 4 can equally well serve a variety of machine sizes and passenger loads, important manufacturing economies can be realized by standardizing the brake components, and a kit of brake conversion parts may be provided for applying my invention to existing machines. Such a kit will be understood to comprise:

(a) The rear-wheel torque-responsive mounting structure of arms 21 and their connection plate region 22;

(b) The spring-suspension structure depicted in FIG. 2;

(c) The Bowden cable 45 and the rear-wheel force pick-off bracket 50 and fitting 49, for attachment to one side of a rear-frame member 16; and (d) The front-wheel brake assembly FB (FIGS. 3 and 4) and its means 40-41 of attachment to a front fork 12.

The foregoing kit assumes that the owner of the bicycle will retain his existing rear-wheel caliper brake and its actuating means 24-25 and that he will assemble such brake to the mounting structure 21-22 of the kit. In the event that he chooses to install all new components, another kit additionally contemplates inclusion of the rear brake RB and its actuating parts 24-25, complete with means for attachment to an existing machine.

Although I have used the alignment 60 as a basis by which to appreciate resultant decelerations which are inherently safe, as compared to those which are unstable, it is possible that my statements as to this alignment 60 may not be entire correct, because the alignment 60 reflects more or less "static" considerations, whereas of course the "dynamic" situation must be all-important. Certainly, my statements as to the alignment 60 reflect a conservative view of the situation, as this alignment would apply for a non-skid lock-up of the front wheel 14.

The kit concept discussed above is well implemented by a modification which I now consider the preferred form of my invention, and which will be described in connection with FIGS. 9, 10 and 11. This modification features a complete rear-axle subassembly, depicted in FIG. 9.

The subassembly of FIG. 9 comprises U-shaped tubular arm structure 65 integrally defining two spaced arms having adjustably secured connection to right and left pivot plates 66-67. Each of the plates 66-67 has an axle-mounting opening, sized to accept journaled support from a bushing element, shown at 68 for the case of plate 67 and at 69 for the case of plate 66 (see FIG. 11). The other end of arm structure 65 is effectively a bridge, centrally formed at 70 to accept fixed mounting of the rear-wheel caliper brake 71, which may be of conventional design and construction and which is therefore only suggested by phantom outline in FIG. 9. The free ends of the arms of structure 65 are flattened, for telescoped reception in channel-shaped embossments 72-73 of the respective plates 66-67, plural bolt openings being provided for various effective radial settings for the bolted engagement of plates 66–67 to structure 65, as dictated by wheel radius for the bicycle to which the invention is applied.

At the near or foreground side of assembly of FIG. 9, a second plate 74 is provided, in face-to-face relation with the inner surface of plate 67. This second plate 74 is centrally apertured to fit over bushing 68 and is utilized to provide a frame-fixed reference at a fitting 75 for coaction with a motion pick-off fitting 76 on plate 67 to actuate the front-brake system, the latter being a conventional front-brake caliper system or as described for the brake FB of FIG. 1. As shown, the pivot plate 66 has an arcuate slot 77 through which the frame-fixed reference fitting 75 extends, and both fittings 75–76 are slotted for location of the rear-axle end of the wire 47 of the front-brake actuating cable 45, it being understood that the sheath of Bowden cable 45 is compressionally referenced to the fixed fitting 75 and that the wire 47 of cable 45 is adjusted for tensed connection to the movable fitting 76; in FIG. 1, the mounting alignment of the fixed fitting 75 is shown by an axis designation 75'. To assure that the second plate 74 will provide a frame-fixed reference, it is shown with an extensive arcuate spread of frame-connecting openings 78 at a radius byond the adjacent radial confines of the pivot plate 67. Frame-connection may be made via any of these openings, for example by bolt to a clamp on one of the adjacent frame struts, such as a rear leg 16; however, in the form shown, a third plate or disc 79 which is centrally apertured to accommodate bushing 68, has face-to-face abutment with the second plate 74. The third plate 79 provides a flange with a series of angularly spaced apertures 80 at the radius of apertures 78 in plate 74, the aperture spacings in one plate being slightly different (e.g., by one or two degrees) from the aperture spacings in the other plate, thus providing a wide range of possible relative angular settings of plates 74–79 with respect to each other (i.e., discrete settings at which at least one opening 78 of plate 74 registers with one opening 80 of plate 79, thereby providing a location which can be secured by bolt means 81); such a range is desirable for adaptation to a variety of bicycle designs, in that an embossed stud 82 in the hub 83 of plate 79 is relied upon to establish the frame-fixed angular reference of plate 79, as between opposed marginal edges of the rear-frame slot 84 (see FIG. 10) in which the rear axle is received and adjustable (for drive-chain tension adjustment).

To permit smooth rotary action between plates 66 and 74, the latter is shown with a small circular embossment 85 around the aperture 86 at which fitting 75 is mounted. This structure establishes a firmly seated reference for fitting 75, and at the same time permits a low-friction washer 87 (barely visible in FIG. 9) to be located at 85 and to provide bearing contact with the adjacent face of plate 66, along margins of slot 77; in similar fashion, another washer 88, as of nylon, is seated to a shoulder of fitting 75 and rides corresponding margins of slot 77 on the other face of plate 74.

In the drawings, plates 66–74 are shown for the normally retracted position in which arm structure 65 is abutting or closely adjacent to the rear-fork legs 16 of the bicycle frame. In this condition, fitting 75 engages the lower angular limit of slot 77, with fittings 75–76 in their closest proximity, and therefore with the parts in readiness to accommodate an application of the brakes via rear brake 71. For return of actuated parts to this unactuated condition, I prefer to employ a coil spring 98 captive between embossments in the adjacent plates 66–74. In the case of plate 66, such an embossment 90 is annular about the pivot opening 91; embossment 90 may be to the same axially offset extent as for the case of channel 73 and is shown to be tangentially continuously formed therewith. In the case of plate 74, a corresponding annular embossment 92 is offset in the axial direction away from embossment 90 and it includes a smoothly and continuously formed tangential extension 93, at an angular location which will not register with channel 73, for the range of angular displacement determined by slot 77. Thus, for the regions of annular registration of annular embossments 90–92, an annular cavity is defined for captive retention of the coiled body of spring 89, and each tangential extension of the cavity is of lesser axial depth. For the preferred arrangement shown, wherein spring 89 is little more than a single turn of 3/16 inch-diameter spring steel wire, the location of spring 89 is always uniquely defined by the described annular closure with tangential end extensions, the ends 89'–89" of spring 89 being tangentially directed at divergent directions. In FIG. 10, spring 89 is shown for its stressed (preloaded) condition, but in the unstressed state of spring 89, the ends 89'–89" diverge in approximately a right-angle relationship, so that if plates 66–74 are initially assembled to spring 89, with end 89' in channel 73 and with end 89" in channel 93 (and prior to assembly of fitting 75 to plate 74), channel 66 will assume an orientation that is displaced about 45° (clockwise about the rear-axle axis 20') from its position shown in FIG. 10. To complete the subassembly of these parts, counterclockwise rotation is imparted to plate 66 with respect to plate 74, building torsional preload in spring 89; such counterclockwise rotation is continued until fitting 75 can be assembled via slot 77 at the aperture 86 of embossment 85, after which time the torsional preload assures a normal assumption of the parts relationship of FIG. 9, i.e., with fitting 75 in abutment with the lower end of slot 77. The torsional preload for this normal condition is in the range of 10 to 20 foot-pounds; a preferred preload of 15 foot-pounds being established for described wire having tangential ends to 1.5-inch radius with respect to the axis 20' — i.e., about 180 pounds at 1.5-inch radius. Such preloading accounts for approximately a 20-pound restorative force at the radius of rear-brake action, for the case of a 27-inch diameter rear-wheel rim.

Figure 11:
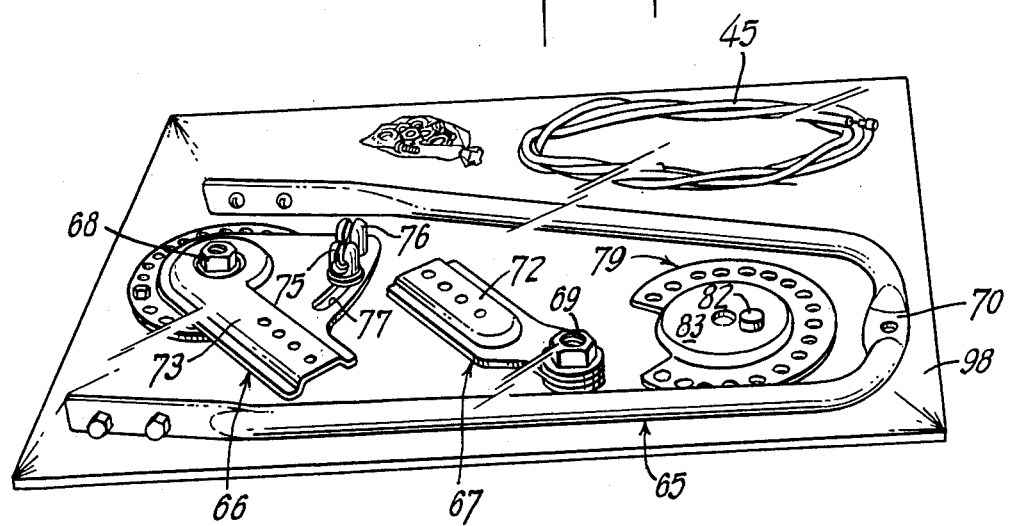
FIG. 11 is a perspective view of the parts of FIG. 9, arrayed as a kit, for conversion of a conventional bicycle to incorporate the invention.

The preferred form of FIGS. 9 to 11 is seen to be of elemental simplicity, as to concept, operation, and ease of application to a bicycle, including a variety of styles of bicycle construction. The parts, including a subassembly of plates 66–74 with preloaded spring 89, fittings 75–76 and bushing 68, are shown in FIG. 11 in spread-out array as a kit, on a mounting board 98, with shrink-plastic coverage and sealing, to complete an easily handled commercial package. The bushing 68 is provided with an outside flange having nut flats 99, adjacent a first bushing land 100 for journaled support of the plates 66–74 at openings 91–94, respectively, and with a second and reduced bushing land 101 which locates in the central opening 96 of plate 79 and which defines a shoulder 102 to clamp plate 79 firmly against adjacent regions of frame means 16–17, upon nut-driving the bushing 68 on the conventional rear-axle threads. It will be understood that the axial extent of land 100 suffices to establish freedom for the described pivot action between plates 66–74, even when plate 79 has been clamped to the adjacent frame.

While the invention has been described in detail for the embodiments shown, it will be understood that modifications may be made without departing from the scope of the invention. For example, it will be understood that for OEM purposes, i.e., when the concept of FIGS. 9 and 10 is applied to a bicycle in the course of manufacture of the bicycle, the plate 79 is not needed, and the embossment lug 82 may be formed as in the annular recess 92 of plate 74; also plate 74 no longer requires the plural openings 78 since plate 74 would be custom-designed for antirotational mounting to the single production-bicycle frame.

What is claimed is:

1. As an article of manufacture for motional pick-off proportioned to instantaneous rear-wheel braking torque on a bicycle, first and second plates having registering rear-axle mounting apertures for mounting over one end of a bicycle rear axle, one of said plates having a slot arcuate about the axis of axle mounting, first motional pick-off connection means carried by the other plate and extending through the slot and retaining said plates in rotationally displaceable face-to-face relation to an arcuate extent permitted by the slot, the adjacent faces of said plates having coacting coil-spring locating recessed formations for locating a coil spring substantially concentric with the rear-axle mounting apertures, such recessed formations including a tangential extension in one plate and an opposite tangential extension in the other plate, a coil spring in retained assembly to said formations and with tangential ends in said extensions, said coil spring torsionally preloading said connection means against an end of the arcuate slot, second motional pick-off connection means carried by said one plate at substantially the slot radius and near said one end of the slot, means on one of said plates adapted for antirotational engagement to a part of the bicycle frame, and means on the other of said plates adapted for caliper-brake mounting of a rear-wheel brake for limited angular displacement against said preload and within the arcuate extent of the slot.

2. The article of claim 1, in which said last-mentioned means includes a channel formation adapted to receive a brake-mounting radius arm, and means for securing a predetermined radius-arm position in said channel formation.

3. The article of claim 1, in which said bicycle-frame engagement means includes an axially adjacent third plate having a rear-axle mounting aperture registering with the apertures of said first and second plates, means for angularly adjustably securing said third plate to its adjacent plate, and bicycle-frame engageable lug means offset from the mounting aperture of said third plate.

4. The article of claim 1, and including a flanged bushing extending through said registering apertures, and of such length beyond the flange thereof as to at least span the combined effective thicknesses of said plates, said bushing having internal threads to engage bicycle rear-axle threads, whereby said bushing may serve as a rear-axle mounting nut without binding said plates against relative rotation.

5. The article of claim 1, in which said first and second pick-off connection means include Bowden-cable engaging formations for one of the corresponding ends of the respective tension-wire and compressional-sheath components of a Bowden cable.

6. The article of claim 1, in which the torsional preloading of said spring means about the mounting-aperture alignment is in the range of 10 to 20 foot-pounds.

7. The article of claim 1, in which the torsional preloading of said spring means about the mounting-aperture alignment is substantially 15 foot-pounds.

8. The article of claim 1, in which the radius of the arc of the slot is in the range of 2 to 3 inches, whereby the mechanical advantage of motional pick-off force is greater than four for an adult-size conventional bicycle.

9. A bicycle-braking system, comprising a rear-wheel caliper brake and means for selectively actuating the same, a front-wheel caliper brake, torque-responsive displaceable means providing a physical-displacement output proportioned to instantaneous braking torque effected by said rear-wheel brake, said displaceable means comprising two radius arms connected to each other and carrying said rear-wheel brake at one end and having rear-axle mounting apertures at their other end, one of said other ends comprising a first of two plates having registering rear-axle mounting apertures for mounting over one end of a bicycle rear axle, one of said plates having a slot arcuate about the axis of axle mounting, first motional pick-off connection means carried by the other plate and extending through the slot and retaining said plates in rotationally displaceable face-to-face relation to an arcuate extent permitted by the slot, the adjacent faces of said plates having coacting coil-spring locating recessed formations for locating a coil spring substantially concentric with the rear-axle mounting apertures, such recessed formations including a tangential extension in one plate and an opposite tangential extension in the other plate, a coil spring in retained assembly to said formations and with tangential ends in said extensions, said coil spring torsionally preloading said connection means against an end of the arcuate slot, second motional pick-off means carried by said one plate at substantially the slot radius and near said one end of the slot, means on the second of said plates adapted for anti-rotational engagement to a part of the bicycle frame, and front-wheel brake-actuating means including Bowden-cable means having a compression-sheath connection to one of said connection means and a tension-wire connection to the other of said connection means.

10. The bicycle-braking system of claim 9, in which each of said arms comprises first and second parts in radially overlapped telescoped relation, and means for adjustably securing the said parts of said arms at selected radius of rear-wheel brake mounting about the rear-axle mounting apertures.

11. The bicycle of claim 9, in which said anti-rotational engagement means includes a third plate having a rear-axle mounting aperture and being adapted for positioning between said second plate and an adjacent portion of the frame of the bicycle, said third plate having said anti-rotational engagement means, and means coacting between said second and third plates for securing the same in a selected relative angular position.

12. The bicycle of claim 11, in which the means coacting between said second and third plates comprises an arcuate region of said second plate having a plurality of bolt apertures at one radius and at a first angular spacing between apertures, and an arcuate region of said third plate having a plurality of corresponding bolt apertures at said one radius and at a second and different angular spacing between apertures, whereby a Vernier-selection of fixed relative angular relation of said second and third plates is available for a single bolt through one of the second-plate apertures in alignment with one of the third-plate apertures.

13. A bicycle comprising a frame, front and rear wheels and separate brakes for said wheels, means for selectively operating said rear-wheel brake, torque-responsive means displaceably mounted with respect to said frame and providing a physical-displacement output proportioned to instantaneous braking torque effected by said rear-wheel brake, spring means referenced to said frame and providing a restorative physical-displacement force in opposition to braking-torque displacement, said displaceable means comprising two radius arms connected to each other and carrying said rear-wheel brake at one end and having rear-axle mounting apertures at their other end, one of said other ends comprising a first of two plates having registering rear-axle mounting apertures for mounting over one end of a bicycle rear axle, one of said plates having a slot arcuate about the axis of axle mounting, first motional pick-off connection means carried by the other plate and extending through the slot and retaining said plates in rotationally displaceable face-to-face relation to an arcuate extent permitted by the slot, second motional pick-off connection means carried by said one plate at substantially the slot radius and near one end of the slot, means carried by the second of said plates in anti-rotational engagement with a part of the bicycle frame, and front-wheel brake-actuating means including Bowden-cable means having a compression-sheath connection to one of said connection means and a tension-wire connection to the other of said connection means.

14. The bicycle of claim 13, in which said plates are both mounted outside one side of said frame and with said first plate axially outside said second plate.

15. The bicycle of claim 13, in which an internally threaded bushing secures the respective axle ends to the bicycle frame, each said bushing including an axially outer radial flange axially retaining the axle-mounted ends of said arms for rotaty displacement about the respective bushings.

16. The bicycle of claim 13, in which said spring means is captively retained by and between said plates.

17. The bicycle of claim 16, in which said spring comprises a one-turn coil of stiff wire supported concentric with the mounting apertures and with tangentially projecting ends engaged to the respective plates.

18. As an article of manufacture for motional pick-off proportioned to instantaneous rear-wheel braking torque on a bicycle, first and second plates having registering rear-axle mounting apertures for mounting over one end of a bicycle rear axle, said plates having a limited arc of relative rotation about their axle-mounting apertures, one of said plates having a cable-reference mounting portion, first motional pick-off connection means carried by the mounting portion of said one plate and projecting through the plane of the other of said plates when said plates are in rotationally displaceable face-to-face relation within said limited arc, the adjacent faces of said plates having coacting coil-spring locating recessed formations for locating a coil spring substantially concentric with the rear-axle mounting apertures, such recessed formations including a tangential extension in one plate and an opposite tangential extension in the other plate, a coil spring in retained assembly to said formations and with tangential ends in said extensions, said coil spring torsionally preloading said connection means in the direction of one end of said limited arc, second motional pick-off connection means carried by said other plate at substantially the mounting-portion radius and near said end of said limited arc, means on one of said plates adapted for anti-rotational engagement to a part of the bicycle frame, and means on the other of said plates adapted for caliper-brake mounting of a rear-wheel brake for limited angular displacement against said preload and within said limited arc.

19. The article of claim 18, said other plate has an arcuate slot for establishing said limited arc, and in which said mounting portion of said one plate registers with the arcuate slot in the other plate.

20. A high-capacity bicycle-brake kit, comprising a front-wheel caliper-brake assembly including means for mounting the same to a bicycle front fork for application to opposed front-wheel rim surfaces, a flexible Bowden cable having one end adaptable for actuating connection to said front-wheel caliper-brake assembly, said cable being of length to extend from the front-fork region to the rear-wheel region of a bicycle, a movable mounting structure for a rear-wheel caliper brake, said mounting structure comprising two spaced arms having rear-axle pivotal mounting means at one end and connected at their other end, said last-mentioned other end having provision for rear-wheel caliper-brake mounting thereto, said rear-axle pivotal mounting means of one of said arms comprising a first plate forming part of said one arm, means including a second plate adapted for anti-rotational mounting to a bicycle rear-frame member near the rear axle and in face-to-face adjacent relation to said first plate, spring-return means comprising a coil spring captively retained by and reacting between said plates, and Bowden-cable connection means carried by said respective plates at adjacent regions having like radial offset from the rear-axle mounting axis.

21. The kit of claim 20, in which said Bowden-cable connection means for the other end of said cable is at substantially lesser radius about the axle-pivot end of said mounting arms than is the location of rear-brake mounting to said mounting structure.

22. The kit of claim 21, in which the radius relation of rear-brake mounting and Bowden-cable connection exceeds 2:1.

23. The kit of claim 21, in which the radius relation of rear-brake mounting and Bowden-cable connection is in the order of 3:1.

24. The kit of claim 20, in which said plates and said coil spring and said Bowden-cable connection means are parts of a single unit-handling subassembly.

25. A high-capacity bicycle-brake kit for use with a bicycle having a front-wheel caliper brake mounted to a bicycle front fork for application to opposed front-wheel rim surfaces, said kit comprising a flexible Bowden cable having one end adaptable for actuating connection to said front-wheel caliper brake, said cable being of length to extend from the front-fork region to the rear-wheel region of a bicycle, and a movable mounting structure for a rear-wheel caliper brake; said mounting structure comprising two spaced arms which are connected at one end and which have provision for rear-wheel caliper-brake mounting at said connected end, a single unit-handling subassembly of two adjacent face-to-face plates one of which plates includes means for anti-rotational mounting to a bicycle rear-frame member near the rear axle and the other of which plates is pivotably mountable on the rear axle and includes means for connection to the otherwise free end of one of said arms, spring-return means captively retained by and torsionally reacting between said plates about the rear-axle axis of said subassembly, and Bowden-cable connection means carried by said respective plates at adjacent regions having like radial offset from the rear-axle axis of said subassembly.

26. The brake kit of claim 25, in which said spring-return means is torsionally preloaded to substantially 15 foot-pounds about the rear-axle axis of said subassembly.

* * * * *